United States Patent
Schaefer et al.

[11] 3,863,739
[45] Feb. 4, 1975

[54] RETARDER CONTROL

[75] Inventors: Robert H. Schaefer, Westfield; Carl A. Lentz, Mooresville, both of Ind.

[73] Assignee: General Motors Corporation, Detroit, Mich.

[22] Filed: Oct. 23, 1973

[21] Appl. No.: 408,277

[52] U.S. Cl............. 188/296, 188/274, 188/181 C, 192/4 B, 74/869
[51] Int. Cl........................................... F16d 57/02
[58] Field of Search...... 188/290, 296, 274, 264 E, 188/181 C; 303/21 FP; 192/4 B, 3.29, 3.34; 74/869

[56] References Cited
UNITED STATES PATENTS

| | | | |
|---|---|---|---|
| 2,946,416 | 7/1960 | Snoy.................................. | 192/4 B |
| 2,990,919 | 7/1961 | Christenson et al................ | 188/296 |
| 3,181,677 | 5/1965 | Fisher et al........................ | 188/296 |
| 3,259,218 | 7/1966 | Black et al........................ | 192/3.29 |
| 3,512,616 | 5/1970 | Bessiere............................ | 188/290 |
| 3,524,523 | 8/1970 | Klimex et al...................... | 188/296 |
| 3,659,687 | 5/1972 | Edmunds........................... | 192/3.34 |
| 3,691,872 | 9/1972 | Schaefer et al.................... | 192/3.29 |
| 3,709,064 | 1/1973 | Schaefer et al.................... | 74/869 |

*Primary Examiner*—George E. A. Halvosa
*Assistant Examiner*—Edward Kazenske
*Attorney, Agent, or Firm*—A. M. Heiter

[57] ABSTRACT

A transmission having a torque converter, hydrodynamic retarder and control system. A regulated pressure source is connected in series through the torque converter, a cooler which restricts flow to the cooler outlet line with the retarder on off valve in either position. The cooler outlet line is regulated at a low pressure and excess fluid flow exhausted to a sump by the converter pressure regulator valve. The retarder on off valve in retarder off position directly exhausts the retarder outlet and blocks the retarder inlet so all cooler outlet flow is connected by the converter regulator valve to sump and in retarder on position connects retarder outlet to join converter outlet flow to the cooler and the cooler outlet to retarder inlet. A retarder regulator valve regulates retarder inlet pressure between a minimum and maximum valve limited by the converter pressure regulator valve and increasing as a function of retarder demand and decreasing as a function of the maximum rate of increase of retarder outlet pressure, for manual control of retarder torque varying as a similar function of retarder speed with increased retarder demand. A torque limiter valve limits retarder outlet pressure and torque. A manually operated electric control simultaneously controls the retarder on off valve and the retarder regulator valve on movement from an off position through a range of on positions to place the retarder on off valve in on position and to manually increase the pressure regulated by the retarder regulator valve.

20 Claims, 4 Drawing Figures

RETARDER REGULATOR VALVE

RETARDER CONTROL

RELATED APPLICATIONS

Applications Ser. No. 311,306 filed Dec. 1, 1972 by Reece R. Fuehrer entitled "Transmission with Retarder and Lubrication System"; Ser. No. 311,931 filed Dec. 4, 1972 by Robert H. Schaefer and Reece R. Fuehrer entitled "Transmission with Retarder and Operating Controls" and Ser. No. 345,725 filed Mar. 28, 1973 by Reece R. Fuehrer and Richard B. Anderson entitled "Transmission with Retarder and Control" are assigned to the same assignee and are related cases showing retarder pressure and torque controls and each incorporated by reference.

BACKGROUND OF THE INVENTION

This invention relates to a transmission with a retarder and controls. Prior art retarders and controls have used similar on off valves as shown in U.S. Pat. Nos. 3,659,687 John O. Edmunds, patented May 2, 1972 entitled "Fluid Drive Transmission with Retarder and Controls" and 3,691,872, Robert H. Schaefer et al. patented Sept. 19, 1972 entitled "Transmission and Controls," each incorporated by reference.

BRIEF DESCRIPTION OF INVENTION

The hydrodynamic retarder has a bladed rotor located in a bladed stator housing and pumping fluid from the retarder inlet to the retarder outlet during rotor rotation.

When the retarder on off valve is in the retarder off position, a source, pump, supplies fluid from a sump under pressure through a cooler to a low pressure regulator valve and connects the retarder outlet to sump and vents the retarder inlet to atmosphere. The retarder on off valve in the retarder on position connects the retarder outlet to join the source supply and flow through the cooler and connects the cooler outlet to the retarder inlet. The retarder inlet pressure is regulated by a retarder inlet pressure regulator valve which reduces retarder inlet pressure as a function of retarder outlet pressure and increases retarder inlet pressure as a funtion of increasing manual retarder capacity demand, so that retarder capacity increases as a similar function of retarder speed as retarder demand increases. A retarder outlet pressure regulator valve limits the range of retarder outlet pressure and torque to the functional range of the inlet pressure control.

The manual retarder demand control on moving from an off position through a range of increasing capacity retarder on positions operates an on off solenoid valve control in all retarder on positions to move the retarder on off valve from off to on position and operates a variable solenoid valve control to control the biasing force applied to the retarder regulator valve to increase retarder inlet pressure as a function of movement through increasing capacity retarder on positions. The variable solenoid valve control in one arrangement is provided by a plurality of sequentially operated solenoids providing a variable pressure control and in another arrangement by one variable operated solenoid providing a variable pressure control. In these controls the rate of increase of retarder capacity is reduced more at higher inlet pressures and less at lower inlet pressures by similarly reducing retarder inlet pressure as a function of retarder outlet pressure so retarder capacity increases at a more constant rate relative to increasing retarder speed for a more discretely controllable system.

These and other features of the invention will be apparent from the following description and drawing of the invention.

Figure 1:
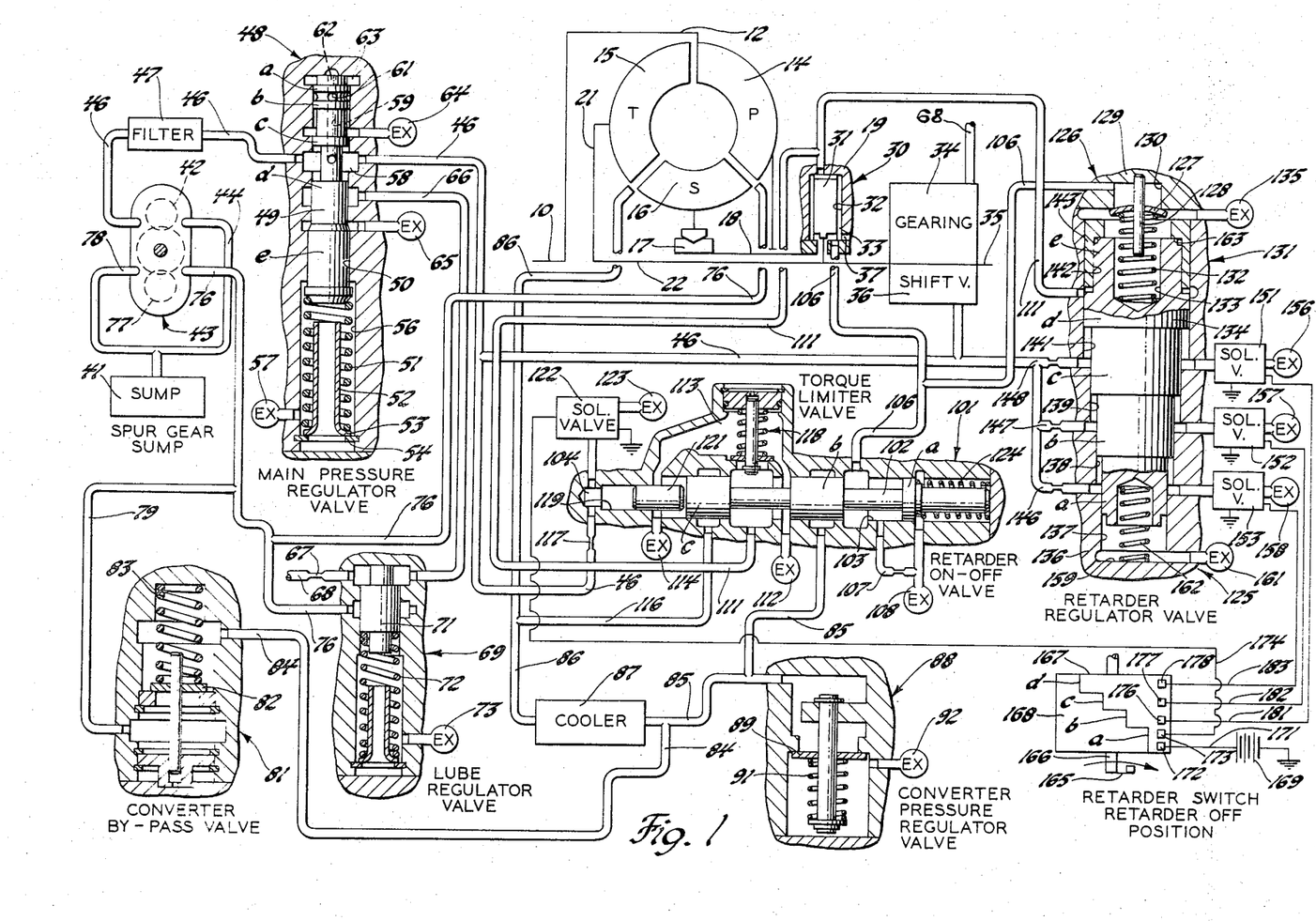
FIG. 1 schematically shows the transmission and retarder and the control system therefor.

Referring to FIG. 1, the power train has an input shaft 10 driving a rotary torque converter housing 12 which drives the pump 14. The pump hydrokinetically drives the turbine 15 and the fluid is redirected by the stator 16 to the pump 14. The stator is mounted on a one way brake 17 secured to a sleeve 18 fixed to the housing 19. The turbine is connected by a hub 21 to the torque converter output shaft 22. A hydrodynamic retarder or brake 30 is provided by a plurality of vanes 31 mounted for rotation with shaft 22 and located in a chamber 32 having fixed vanes 33 formed in the transmission housing 19. The retarder may be of the paddle wheel type as shown or the toric flow type as shown in the above application Ser. No. 345,725.

A suitable gear unit 34 having two or more fluid operated ratio engaging devices normally connects shaft 22 to output shaft 35. The manual or automatic shift valve unit 36 selectively connects main line 46 to these devices to selectively engage the drive ratios. Retarder chamber 32 is centrally connected by atmospheric vent 37 to atmosphere in the housing of gear unit 34 so air may enter when fluid is evacuated from chamber 32. The restricted exhaust 107 at the retarder on-off valve may also provide the atmospheric vent.

FLUID SUPPLY

The fluid exhausted from the control and lubrication system collects in the sump 41 in the lower portion of the transmission housing. One pump 42 of a three elements per gear pump 43 draws fluid through the suction line 44 and delivers fluid to the main line 46 which passes through the filter 47 and is regulated by the main pressure regulator valve 48. The main pressure regulator valve 48 has a valve element 49 having lands $a$, $b$, $c$, $d$ of equal diameter and a larger land $e$ located in a stepped bore 50. The valve element 49 is biased to the closed position shown by a spring 51 mounted on a combined spring seat and stop element 52 which is a tubular member to limit valve movement and spring compression which has a flared end 53 providing a seat for the spring and abutting snap ring 54 to retain the seat element and spring in spring chamber 56 vented by exhaust 57. The main line 46 is connected between the lands c and d and through port 58 and the bore 59 through the valve to the port 61 between the lands a and b and the port 62 at the end of the valve element to provide hydraulic bias in chamber 63 opposing the spring to regulate the main line pressure at a predetermined value, i.e., 165 psi. Regulated pressure is supplied by port 61 to the space between the lands $a$ and $b$ to prevent leakage from chamber 63 to the space between lands $b$ and $c$ vented by exhaust 64 to provide a positive seal between the main line pressure at port 58 and chamber 63 for improved regulation. The forward knockdown pressure may be connected at the step between lands *d* and *e* to reduce the regulated pressure to, i.e., 165 psi, in all forward drive positions while pressure in reverse drive is higher, but since the gearing control details are not shown, this step is vented by exhaust 65. Excess main line pressure in line 46 and chamber 63 moves the regulator valve element 49 to the exhaust position exhausting line 46 to overage line 66 which feeds through restriction 67 to the lubrication line 68 which lubricates the gearing. Overage line 66 is also connected to the lubrication relief regulator valve 69 which has a valve element 71 biased to a closed position by a spring 72 in a chamber vented by exhaust 73 and is closed when the overage pressure does not exceed a low value to first supply lubrication line 68. When the lubrication pressure is sufficient, overage pressure exceeds this intermediate value, i.e., 80 psi, and the valve 69 opens to connect overage line 66 to the converter feed line 76 to supply fluid to the torque converter. The other pump 77 of the pump unit 43 draws fluid via suction line 78 and delivers fluid to the converter feed line 76 to provide the main feed to the torque converter. When this torque converter feed pressure exceeds cooler outlet line 85 pressure by a low pressure value, i.e., 45 psi, excess fluid flows via branch 79 of converter feed line 76 moving valve element 82 against the bias spring 83 of converter bypass valve 81 to connect or exhaust converter feed pressure via branch 84 to the cooler outlet line 85. The converter outlet line 86 is connected through the cooler 87 to the cooler outlet line 85 where the pressure is limited by the converter pressure regulator valve 88 which has a valve element 89 normally biased by spring 91 to block passage to exhaust 92 but which, at a predetermined low pressure, i.e., 50 psi, opens to exhaust 92 to limit the pressure in cooler outlet line 85. When the cooler outlet line 85 pressure is at this maximum low pressure value, i.e., 50 psi, the maximum converter feed line 76 pressure is at a higher intermediate value, i.e., 70 psi, due to the converter and cooler pressure drop.

Retarder On-Off Valve and Torque Limiter Valve

The retarder on-off valve 101 controls the operation of the hydrodynamic retarder 30. There is a valve element 102 having lands *a*, *b* and *c* of equal diameter located in a bore 103 and is biased to the retarder off position shown by pressure located in a chamber 104. In retarder off position, the retarder in-line 106 is connected between the lands *a* and *b* to the restricted exhaust line 107 connected to exhaust 108. The cooler out-line 85 is blocked by land *b*, the retarder out-line 111 is connected between lands *b* and *c* to exhaust 112 and via exhaust passage 113 to exhaust 114. Converter out branch line 116 is blocked by land *c*. The main line 46 is connected by a restriction 117 to the chamber 104 at the end of bore 119 having a plug 121 therein which acts on the valve element 102 when chamber 104 is pressurized. The manually controlled solenoid vlave 122 is normally spring closed to pressurize chamber 104 and position the retarder valve element 102 in the position shown, the retarder off position. When the solenoid valve 122 is energized to vent chamber 104 to exhaust 123, the spring 124 moves the valve 102 to the left, to the brake on position, connecting cooler out-line 85 to retarder line 106, and retarder outlet line 111 to the converter outlet or cooler inlet line 116. Retarder outlet line 111 is always connected to a spring loaded pressure relief valve 118 or torque limiter valve which regulates the retarder outlet pressure at an intermediate value, i.e., 70 psi, to provide a controlled amount of hydrodynamic retarding.

Retarder Regulator Valve

The retarder regulator valve 125 has a regulator portion 126 having a regulator valve element 127 axially slidable on a guide pin 128 fixed in the valve body end portion 129 and located concentrically in axial port 130 which is connected to retarder inlet line 106. A biasing control portion 131 includes a spring 132 seated in a guide bore 133 in abutment plug 134 biasing regulating valve element 127 to close port 130 to regulate retarder inlet pressure in line 106 and opens in response to retarder inlet pressure to connect excess fluid to exhaust 135. The abutment plug 134 has stepped lands located in a stepped bore in a main body portion 136. The abutment plug, described from the end opposite the regulator valve has a first small land *a* in small bore 137, a second land *b* larger than land *a* in a second larger bore 138, a third land *c* larger than land *b* in a larger bore 139, a fourth land *d* larger than land *c* in a larger bore 141 and a fifth land *e* smaller than land *d* in a bore 142 in a sleeve portion 143 of the valve body end portion 129. The sleeve portion 143 is secured to body portion 136 and located and sealed in bore 141. The main line 46 is connected by restricted branches 146, 147 and 148, respectively to bores 138, 139 and 141 at their step with the next smaller bore to act on the differential area of lands *b*, *c* and *d*. The differential area of lands *b*, *c* and *d* are respectively the area of lands *b*, *c* and *d* respectively minus the area of lands *a*, *b* and *c*. Normally open solenoid valves 151, 152 and 153 are connected respectively to bores 141, 139 and 138 at the step with the next smaller bore like the restricted passages or to the port of the respective restricted passage to normally connect the bores to their exhaust 156, 157 and 158. These solenoid valves, when energized, close to retain line pressure in the bore to which the solenoid valve is connected. The body 136 has at the end of bore 137 a spring abutment end 159 and exhaust 161. An abutment spring 162 seated on the body end 159 biases the abutment plug toward the regulator valve 127 so the opposite end engages stop shoulder 163. The retarder outlet line 111 is connected to bore 141 at the step with bore 142 to act on the differential area of land *d* with respect to land *e*.

A conventional manual retarder or brake apply lever 165 returned by a retraction spring (not shown) to a retarder off position is connected by linkage such as rotary shaft 166 to rotate the control switch drum 167 in the direction of the arrow through a range of retarder on positions in response to manual movement and is returned by the retraction spring. The drum 167 has a drum contact surface 168 continuously supplied in all retarder on positions by the grounded D.C. electric power source, a battery 169, connected by conductor 171 and contact 172. When the retarder switch drum 167 is rotated from the retarder off position shown, the contact surface 168 at edge *a* first contacts the contact 172 and contact 173 which is connected by conductor 174 to grounded solenoid valve 122 to energize and open the valve 122 to vent chamber 104 to permit the spring 124 to move retarder on off valve to the on position. On continued retarder on movement of drum 167 the contact surface 168 at edges *b*, *c* and *d* successively and respectively also contact the contacts 176, 177 and 178 respectively connected by conductors 181, 182 and 183 to solenoid valves 151, 152 and 153.

Modified Retarder Regulator Valve

Figure 2:
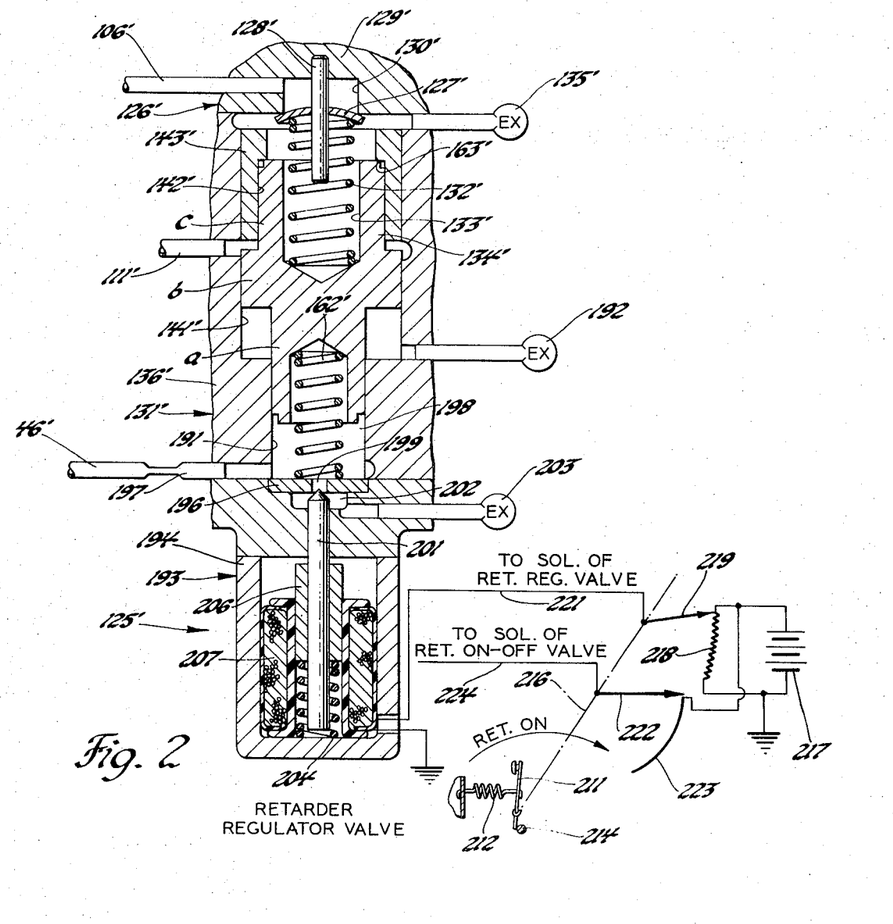
FIG. 2 shows a modified retarder regulator valve.

The modified retarder regulator valve 125', FIG. 2, has the same type regulator portion 126' so the same reference numbers primed have been used. The regulator valve element 127' is slidable on a pin 128' fixed in the end portion 129' of the valve body to close port 130' connected to retarder inlet line 106'. The biasing control 131' has a similar spring 132' in bore 133' of abutment plug 134' to bias valve element 127' closed. Retarder inlet pressure opens the valve element to exhaust 135'. The valve body end portion 129' has a sleeve 143' having internal bore 142' for land 134' C and externally fitting in bore 141' of the main body portion 136'. The other portions of the biasing control 131' is modified and primed and additional unprimed reference numerals have been used. The abutment plug 134' has a small land $a$ in small bore 191, a large land $b$ in bore 141' and another small land $c$ in small bore 142'. The retarder outlet line 111' is connected to bore 141' at the step to bore 142' to act on the differential area of land $b$ relative to land $c$ to act in a bias reducing direction. The bore 141' at the step to smaller bore 191 is vented to exhaust 192 so no pressure acts on the differential area of land $b$ with respect to land $a$.

A solenoid valve 193 has a housing 194 secured and sealed to the end of the main body portion 136'. The housing secures a closure plate 196 at the end of bore 191. The main line 46' is connected by a restricted branch 197 at the end of bore 191 to the fluid biasing chamber 198 to supply fluid under pressure to act on land $a$ to bias abutment plug 134' in a pressure increasing direction. The plate 196 has an exhaust port 199 controlled by an exhaust valve element 201 slidably mounted in a bore in housing 194 to control exhaust fluid flow from pressure chamber 198 to exhaust chamber 202 and exhaust 203. The exhaust valve element 201 is biased to close port 199 by spring 204 seated on a portion of the housing and a shoulder or the end of the magnetic sleeve 206 fixed to the valve element and biased to an open position by a magnetic force provided by the solenoid winding or coil 207. A biasing spring 162' seated on end plate 196 biases the abutment plug 134' in a pressure increasing direction limited by stop abutment 163'.

The solenoid valve 122 which controls the retarder on off valve and the solenoid valve 193 which controls the retarder regulator valve 126' are controlled by a retarder pedal lever 211 shown held in the retarder off position by retraction spring 212 connected to the lever and vehicle frame to hold the lever against the retarder off stop 214 also on the frame.

The pedal lever 211 on movement in a retarder on direction by suitable linkage rotates the switch shaft 216 in the retarder on direction indicated by the arrow. The electric circuit has a grounded D.C. power source or battery 217. A variable impedance, e.g., a potentiometer 218, is connected across the battery and has a rotary adjustable tap 219 rotatable with shaft 216 and connected by connector 221 to grounded solenoid coil 207. The position of the adjustable tap determines the proportion of battery voltage applied to the coil 207. Retarder on movement decreases voltage to coil 207 to decrease magnetic force so the spring force increases biasing pressure in chamber 198 and regulated retarder inlet pressure. A rotary tap 222 also rotating with shaft 216 contacts contact 223 connected to the battery in all retarder on positions to connect the battery via contact 223, tap 222 and connector 224 to solenoid 122 to move the retarder on off valve to the retarder on position. In the retarder off position shown the rotary adjustable tap 219 contacts the minimum impedance portion of impedance 218 to provide full battery voltage to coil 207 to open exhaust valve 201 for minimum pressure regulation and rotary tap 222 is disconnected from contact 223 so solenoid 122 is deenergized to place retarder on off valve 101 in the off position.

OPERATION

When the engine driving this transmission is running, the transmission input driven pump 42 supplies fluid under pressure to the main line 46 which is regulated by regulator valve 48 at a normal line pressure value, i.e., 165 psi. The regulator valve exhaust or overage line 66 is connected through restriction 67 to the lubrication line 68 which lubricates the transmission. The overage line is maintained above a lower pressure value i.e., 80 psi, to properly feed the lubrication system and excess fluid is then bypassed by lubrication regulator valve 69 to the converter feed line 76 which is also supplied with fluid by a second input pump 77. The converter feed pressure in line 76 is limited to a low pressure differential above the cooler outlet pressure, i.e., 45 psi, by the converter bypass valve 81 which bypasses overage to the cooler outlet line 85. The maximum converter feed pressure is also limited to an intermediate pressure, i.e., 70 psi by the converter pressure regulator valve 88 limiting cooler outlet pressure to a low value, i.e., 50 psi, increased by the normal converter and cooler pressure drop. The converter outlet flow in line 86 passes through the cooler 87 to the cooler outlet line 85. The converter regulator valve 88 regulates to limit the cooler outlet line at a low pressure, i.e., 50 psi, to also limit converter inlet pressure to an intermediate value, i.e., 70 psi, above cooler outlet pressure by the converter and cooler pressure drop and exhausts excess fluid to sump when the retarder on off valve 101 is in the off position. When the retarder valve 101 is in the on position, the cooler outlet line is connected by brake inlet line 106 to supply the hydrodynamic retarder 30 at a pressure not above the pressure limited by the converter regulator valve 88 and at the pressure, i.e., 0 to 50 psi, regulated by the retarder regulator valve 125. In the retarder off position shown, the cooler outlet line 85 is blocked and all fluid flows via exhaust 92 to sump 41.

The first or main input pump 42 supplies the main line 46 regulated by regulator valve 48 at a high pressure, i.e., 180 psi, for a conventional gearing control system as shown in the Robert H. Schaefer and Joseph R. Fox U.S. Pat. No. 3,691,872 granted Sept. 19, 1972. The lubrication valve 69 regulates lubrication pressure at a next lower intermediate pressure, i.e., 80 psi, and the lubrication overage substantially continuously supplements the second or converter supply input pump 77 which supplies the torque converter inlet 76. The converter inlet pressure is limited by converter bypass valve 81 at a next lower intermediate pressure to a low differential pressure above cooler outlet pressure, i.e., 45 psi, and the overage is not exhausted but connected to a bypass line 84 to the cooler outlet where pressure is limited at a lowest value, i.e., 50 psi, to supplement the supply to the retarder 30, also supplied through the converter and cooler. The torque limiter valve 118 limits the retarder out pressure during retarder operation to an intermediate pressure, i.e., 70 psi, so retarder out flow will join converter out flow and pass through the cooler to the retarder valve for the retarder inlet. The converter bypass valve 81 functions in conjunction with the flow through the converter and cooler to deliver all available fluid, oil, to supply the retarder. Thus, when the retarder valve 101 has just been placed in the retarder on position, and the chamber 32 is being filled, converter regulator valve 88 will close so that all fluid is available for the retarder. Fluid is not withdrawn from the converter by the normal centrifugal pump action of the illustrated retarder having a central inlet and a peripheral outlet which lowers inlet pressure and increases outlet pressure proportional to rotor speed. During normal operation of the converter and/or retarder, converter regulator valve 88 will open exhausting excess fluid to sump. The converter regulator valve, when the retarder is off, regulates to establish a uniform pressure drop across the converter and cooler for normal flow, when the retarder is on and being filled, closes to deliver all available oil and when the retarder is on the retarder inlet pressure is regulated by the retarder regulator valve 125. If, during retarder operation, high retarder outlet flow reduces converter outlet flow, this fluid is bypassed by the converter bypass valve and is available, as a secondary supply to the retarder.

When the retarder pedal 165 is in off position, the switch drum 167 is in the off position shown disconnecting all solenoid contacts 173, 176, 177 and 178 from the battery contact 172 so the retarder is off. When the solenoid 122 is de-energized it closes the passage to exhaust 123, so main line 46 pressure supplied via restriction 117 to chamber 104 acts on plug 121 to hold retarder on off valve element 102 in the off position shown against the bias of spring 124. The converter outlet line branch 116 is blocked by land 102c, so converter outlet flow in line 86 passes through cooler 87 to cooler outlet line 85 which is blocked by land 102b of the retarder on off valve so the cooler outlet pressure is regulated by the converter pressure regulator valve 88 at a low pressure, i.e., 50 psi, and the flow passed to sump. The converter inlet pressure is higher, i.e., 70 psi, due to the converter and cooler pressure drop. At the retarder on off valve 101, the retarder inlet line 106 is vented by restriction 107 to exhaust 108 and the retarder outlet line 111 is connected to exhaust 112 to exhaust retarder chamber 32 for no retarding. The deenergized normally open solenoids 151, 152 and 153 vent the bias control bores 141, 139 and 138 of manual control pressure so regulator valve 125 is in minimum pressure regulating condition but since the retarder chamber and inlet line is exhausted and evacuated by retarder pumping action there is no inlet pressure to be regulated.

Figure 3:
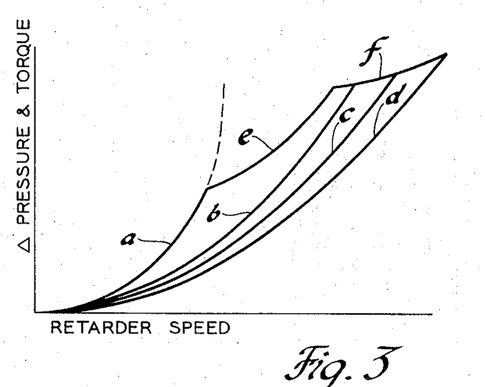
FIG. 3 shows a plot of retarder differential pressure and torque against retarder speed.
Figure 4:
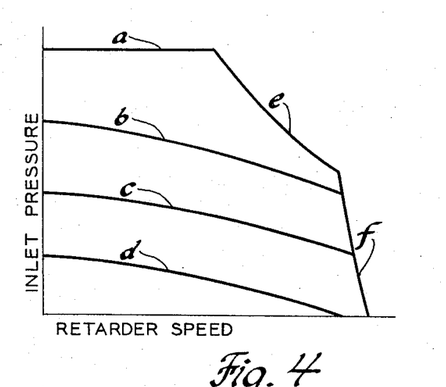
FIG. 4 is a plot of retarder inlet pressure against retarder speed.

When the retarder pedal 165 is moved from the retarder off position through the range of retarder on positions to full on position, the battery contact 172 is connected through drum contact 168 first to contact 173 to energize solenoid valve 122 and then consecutively to contacts 176, 177 and 178 to respectively energize solenoid valves 151, 152 and 153. The connection from battery contact 172 to each solenoid contact once made in the above consecutive order is maintained with continued drum rotation to the full on position. Return movement of the pedal 165 and drum 167 disconnects the contacts in the inverse order. On initial movement to and throughout the range of retarder on positions, the energized solenoid vlave 122 exhausts chamber 104 to exhaust 123 so spring 124 moves retarder on off valve element 102 to the retarder on position to substantially simultaneously cause land a to block restricted exhaust 107, to connect cooler outlet line 85 between lands a and b to retarder inlet line 106, to cause land b to block exhaust 112 and to connect retarder outlet line 111 between lands b and c to branch line 116 to join converter out flow in line 86 through cooler 87 to cooler outlet line 85 for loop circuit flow to the retarder. The retarder on off valve 101 remains in this retarder on position throughout the range of retarder on positions of pedal 165. In this first increment of movement in the retarder on range drum switch 167 does not energize contacts 176, 177 and 178 and their respective solenoids 151, 152 and 153 so main line pressure does not act as a biasing pressure on the differential area of lands d, c and b of abutment plug 134. The differential area of lands b, c and d is their area respectively reduced by the area of lands a, b and c. The position and bias force of the abutment plug or biasing control for determining retarder inlet pressure is determined by retarder outlet pressure supplied by line 111 acting on the differential area of land d with respect to land e of the abutment plug 134 acting in a bias and pressure reducing direction against the force of spring 162 and the opposing manually controlled biasing pressures. Thus in this first or initial phase of retarder on operation, the retarder inlet pressure is regulted at a low value decreasing with increasing retarder speed. The retarder inlet pressure is determined by spring 162 bias decreased as a function of retarder outlet pressure as shown by curve d, FIG. 4. Then as the drum switch 167 is moved to a second and third phase of the retarder on positions, the respective contact 176 and 177 and the solenoid valves 151 and 152 are also energized to close exhaust 156 and 157 so main line pressure also acts on the differential area of land d in the first phase and of lands d and c in the second phase to increase by a step in each of the second phase and third phase the above described first phase pressure regulation providing higher retarder inlet pressure, curve c and curve b, FIG. 4. Similarly as drum switch 167 is moved to the fourth phase of the retarder on positions the contact 178 and its respective solenoid valve 153 are also energized so that main line pressure also acts in the fourth phase on the differential area of land b, so the pressure acts on lands d, c and b, to further increase the manually controlled bias on abutment plug 134 and retarder inlet pressure. In a low retarder speed range the full fourth phase manually controlled biasing pressures acting on lands d, c and b provides a larger force than the opposing retarder outlet pressure line 111 bias on the differential area of land d with respect to land e, so the abutment plug 134 is held fixed against stop shoulder 163 its highest pressure position, so spring 132 regulates retarder inlet pressure at the highest constant value as shown by curve a, FIG. 4. In a higher retarder speed range retarder outlet pressure on land d with respect to land e provides an increasingly larger force than the manual bias pressures on lands d, c and b with respect to lands c, b and a to move the abutment plug 134 against the bias of spring 162 to reduce the bias of plug 134 and reduce the retarder inlet pressure at an intermediate rate as a function of increasing retarder speed as indicated by curve e, FIG. 4. The retarder torque limiter valve limits retarder outlet pressure, i.e., 70 psi, and thus limits and prevents retarder operation pressure at maximum speed as indicated by the extremely high rate of reduction of retarder inlet pressure curve f, FIG. 4. Such retarder inlet pressure relative to retarder speed as shown by the curves of FIG. 4 provide retarder differential pressure, Δ pressure, and retarder torque relative to retarder speed as shown by the similarly referenced curves of FIG. 3. Retarder differential pressure is the retarder outlet pressure minus the retarder inlet pressure. Thus this control system provides stepped or straighter higher retarding torque capacity curves, i.e., curve a–e, and straighter medium and lower retarding torque capacity curves, i.e., b, c and d, since the normal retarder torque capacity square curve dotted line is modified by retarder outlet pressure to a higher degree with higher retarder demand. Thus retarder capacity increases more consistently with retarder speed and with retarder inlet pressure to provide improved discrete response to manual control related to retarder inlet pressure.

The modified control shown in FIG. 2 provides infinitely variable retarder inlet pressure control similar to the stepped pressure control provided in the FIG. 1 system. When the brake lever 211 is moved to the retarder on range, contacts 222 and 223 engage to energize solenoid 122 to position the retarder on off valve 101 in on position and variable potential contacts 218–219 increase the bias of solenoid 207 on valve 201 to increase the pressure in chamber 198 and thus the pressure increasing force of abutment plug 134' gradually. The retarder outlet pressure in line 111' also similarly acts on the abutment plug to decrease pressure. This system provides the above discussed retarder inlet pressures and retarder differential pressures and torques relative to speed respectively as shown by curves a–e, b, c, d and f in FIGS. 3 and 4 and also all intermediate curves similar to these curves. Thus this system provides the same operation and also permits manually controlled infinite variation of inlet pressure and retarder differential pressure and torque controlled and limited in the same way by retarder outlet pressure and the torque limiter valve.

It will be appreciated that the invention may be used in the above described preferred embodiment and modifications thereof.

It is claimed:

1. In a hydrodynamic retarder, a stator chamber having stator blades, an inlet connected to a radial inner portion and an outlet connected to a radial outer portion; a rotor rotatably mounted in said stator chamber and pumping fluid from said inlet to said outlet during rotor rotation; cooler means including an inlet and an outlet and providing a pressure drop therebetween; a sump; source means connected to said sump and said cooler means supplying fluid from said sump under pressure to said cooler means; a low pressure regulator valve connected to said cooler outlet to regulate cooler outlet pressure at a low value and exhaust excess fluid to said sump; retarder on off valve means operative in off position to connect said retarder outlet and retarder inlet to exhaust and in on position connecting said retarder outlet to said cooler inlet and said cooler outlet to said retarder inlet; retarder pressure regulator valve means connected to said retarder inlet and said retarder outlet and having biasing means including manual control means movable from a retarder off position to a full retarding demand position for increasing retarding demand and outlet pressure responsive control means connected to said retarder outlet; said biasing means operative in response to said manual control means increasing retarding demand to increase the force of said biasing means and to decrease the force of the biasing means as a function of retarder outlet pressure and said regulator valve means regulating said retarder inlet pressure at increasing pressure values as a function of increasing bias force to provide retarder torque increasing with retarding demand and increased with speed at a rate reduced with increasing speed.

2. The hydrodynamic retarder defined in claim 1 and said regulator valve means providing retarder torque increasing with retarding demand and increasing with speed at low speeds and increasing with speed at a lower rate at higher speeds.

3. The hydrodynamic retarder defined in claim 1 and said regulator valve means regulating retarder inlet pressure and providing retarder torque increasing with retarding demand and increasing with speed at less than a square curve value in response to retarder outlet pressure.

4. The hydrodynamic retarder defined in claim 1 and said regulator valve means providing retarder torque increasing with retarding demand and increasing with speed at a high rate at low speed and high retarding demand and increasing with speed at a lower rate at higher speeds.

5. The hydrodynamic retarder defined in claim 1 and said regulator valve means providing retarder torque increasing with retarding demand and increasing on a first square speed curve at low speed and changed in response to retarder outlet pressure at a mid speed and pressure point to operate on a second square speed curve to provide linearly increasing torque over a larger speed range.

6. The hydrodynamic retarder defined in claim 1 and said retarder outlet having a pressure limiting valve to limit the retarder torque at a substantially linear maximum value.

7. The hydrodynamic retarder defined in claim 1 wherein said manual control means controls both said retarder on off valve means and said retarder pressure regulator valve means and includes a manually controlled member movable from an off position through a range of increasing retarder capacity demand positions operative in retarder off position to position said retarder on off control valve means in retarder off position and operative on movement through said range of increasing retarder capacity positions to position and maintain said retarder on off control valve means in retarder on position and to control said retarder regulator valve means to increase the regulated pressure with increasing retarder capacity demand positions of said manually controlled member.

8. The hydrodynamic retarder defined in claim 7 and said manual control means including first solenoid means to position said retarder on off control valve means and second solenoid means to control said retarder regulator valve means, an electric power source, a switch controlled by said manually controlled member operative in retarder off position to control said first solenoid means to position said retarder on off control valve means in off position and to control said second solenoid means to control said regulator valve means for minimum pressure regulation and on movement through said range of retarder on positions to control said first solenoid to position said retarder on off control valve means in on position and to control said second solenoid valve means to increase the pressure regulated by said regulator valve means with retarder capacity demand.

9. In a hydrodynamic retarder, a stator chamber having stator blades, an inlet connected to a radial inner portion and an outlet connected to a radial outer portion; a rotor rotatably mounted in said stator chamber and pumping fluid from said inlet to said outlet during rotor rotation; a cooler having an inlet and an outlet and providing a pressure drop therebetween; a sump; source means connected to said sump and said cooler inlet supplying fluid from said sump under pressure to said cooler inlet through said cooler to said cooler outlet; a low pressure regulator valve connected to said cooler outlet to regulate cooler outlet pressure at a low value and source pressure at a high value and exhaust excess fluid to said sump; retarder on off valve means operative in off position to connect said retarder outlet and retarder inlet to exhaust and maintain said source connected through said cooler and low pressure regulator valve to said sump and in on position connecting said retarder outlet to said cooler inlet and said cooler outlet to said retarder inlet; retarder pressure regulator valve means connected to said retarder inlet and said retarder outlet and having biasing means including manual control means movable from a retarder off position to a full retarding demand position for increasing retarding demand and outlet pressure responsive control means connected to said retarder outlet; said biasing means operative in response to said manual control means increasing retarding demand to increase the force of said biasiing means and to decrease the force of the biasing means as a function of retarder outlet pressure and said regulator valve means regulating said retarder inlet pressure at increasing pressure values as a function of increasing bias force to provide retarder torque increasing with retarding demand and increased with speed at a rate reduced with increasing speed.

10. The hydrodynamic retarder defined in claim 9 and said regulator valve means providing retarder torque increasing with retarding demand and increasing with speed at low speeds and increasing with speed at a lower rate at higher speeds.

11. The hydrodynamic retarder defined in claim 9 and said regulating valve means providing retarder torque increasing with retarding demand and increasing with speed at a high rate at low speed and high retarding demand and increasing with speed at a lower rate at higher speeds.

12. The hydrodynamic retarder defined in claim 9 and said regulator valve means providing retarder torque increasing with retarding demand and increasing on a first square speed curve at low speed and changed in response to retarder outlet pressure at a mid speed and pressure point to operate on a second square speed curve to provide linearly increasing torque over a larger speed range.

13. The hydrodynamic retarder defined in claim 12 and said retarder outlet having a pressure limiting valve to limit the retarder torque at a substantially linear maximum value.

14. In a hydrodynamic retarder, a stator chamber having stator blades, an inlet connected to a radial inner portion and an outlet connected to a radial outer portion; a rotor rotatably mounted in said stator chamber and pumping fluid from said inlet to said outlet during rotor rotation; a cooler having an inlet and an outlet and providing a pressure drop therebetween; a sump; source means connected to said sump and said cooler inlet supplying fluid from said sump under pressure to said cooler inlet through said cooler to said cooler outlet; a low pressure regulator valve connected to said cooler outlet to regulate cooler outlet pressure at a low value and source pressure at a high value and exhaust excess fluid to said sump; retarder on off valve means operative in off position to connect said retarder outlet and retarder inlet to exhaust and maintain said source connected through said cooler and low pressure regulator valve to said sump and in on position connecting said retarder outlet to said cooler inlet and said cooler outlet to said retarder inlet; on off solenoid valve means connected to said source means and said retarder on off valve operative when energized to place said retarder on off valve in on position and when deenergized in off position; retarder pressure regulator valve means connected to said retarder inlet and said retarder outlet and having biasing means and biasing solenoid valve means connected to said source means and said biasing means operative in response to progressively increased energization of said biasing solenoid valve means to increase the force of said biasing means and to decrease the force of said biasing means as a function of increasing retarder outlet pressure; said regulator valve means regulating said retarder inlet pressure at increasing pressure values not greater than said low valve of cooler outlet pressure as a function of increasing bias force to provide retarder torque increasing with speed and biasing solenoid energization and decreasing with increasing retarder outlet pressure; manual control means connected to said on off solenoid valve means and said biasing solenoid valve means operative in a retarder off position to deenergize both solenoid valve means and on movement through a range of retarder on positions continuously energizing said on off solenoid valve means and progressively increasing the energization of said biasing solenoid vlave means.

15. The hydrodynamic retarder defined in claim 14 and a pressure limiting valve connected to said retarder outlet to limit maximum retarder outlet pressure and retarder torque.

16. The hydrodynamic retarder defined in claim 14 and said biasing solenoid valve means including a plurality of solenoid valves each operative on energization to increase the force of said biasing means and said manual control means operative on movement through said range of retarder on positions progressively energizing additional solenoid valves.

17. The hydrodynamic retarder defined in claim 14 and said biasing solenoid valve means being a variable force solenoid valve operative on variable energization to progressively increase the force of said biasing means and said manual control means operative on movement through said range of retarder on positions to progressively increase the energization of said variable force solenoid valve.

18. The hydrodynamic retarder defined in claim 14 and said regulator valve means providing retarder torque increasing with retarding demand and increasing with speed at a high rate at low speed and high retarding demand and increasing with speed at a lower rate at higher speeds.

19. The hydrodynamic retarder defined in claim 14 and said regulator valve means providing retarder torque increasing with retarding demand and increasing on a first square speed curve at low speed and changed in response to retarder outlet pressure at a mid speed and pressure point to operate on a second square speed curve to provide linearly increasing torque over a larger speed range.

20. In a hydrodynamic retarder, a stator chamber having stator blades, an inlet connected to a radial inner portion and an outlet connected to a radial outer portion; a rotor rotatably mounted in said stator chamber and pumping fluid from said inlet to said outlet during rotor rotation; a cooler having an inlet and an outlet and providing a pressure drop therebetween; a sump; pump means connected to said sump and said cooler inlet supplying fluid from said sump under pressure; retarder on off valve means connected to said retarder outlet and retarder inlet operative in off position to exhaust said stator chamber and in on position connecting said retarder outlet and said pump means to said retarder inlet; on off solenoid means connected to said retarder on off valve operative when selectively energized and deenergized to place said retarder on off valve in the on and the off position; retarder pressure regulator valve means connected to said retarder stator chamber to control retarder pressure and capacity and having biasing means and biasing solenoid means connected to said biasing means operative in response to controlled energization to increase the force of said biasing means; said regulator valve means regulating pressure at increasing pressure values as a function of increasing bias force; manual control means connected to said on off solenoid means and said biasing solenoid means operative in a retarder off position to control energization of both solenoid means to position said retarder on off control valve means in off position and said regulator valve means in minimum pressure regulating position and on movement through a range of retarder on positions to control energization of said on off solenoid means to position said retarder on off control valve means in on position and to control the energization of said biasing solenoid means to progressively increase the pressure regulated by said regulator valve means.

* * * * *

PO-1050
(5/69)

UNITED STATES PATENT OFFICE
CERTIFICATE OF CORRECTION

Patent No. __3,863,739__        Dated __February 4, 1975__

Inventor(s) __Robert H. Schaefer et al__

It is certified that error appears in the above-identified patent and that said Letters Patent are hereby corrected as shown below:

IN THE ABSTRACT:

Line 16, "valve" should be -- value --.

IN THE SPECIFICATION:

Column 3, line 58, "vlave" should be -- valve --.

IN THE CLAIMS:

Column 12, line 34, after "low" "valve" should be -- value --.

Signed and sealed this 29th day of April 1975.

(SEAL)
Attest:

RUTH C. MASON
Attesting Officer

C. MARSHALL DANN
Commissioner of Patents
and Trademarks